(12) United States Patent
Kawakami

(10) Patent No.: US 9,162,532 B2
(45) Date of Patent: Oct. 20, 2015

(54) TIRE

(71) Applicant: BRIDGESTONE CORPORATION, Chuo-ku, Tokyo (JP)

(72) Inventor: Yuki Kawakami, Pomezia (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/359,885

(22) PCT Filed: Nov. 22, 2012

(86) PCT No.: PCT/JP2012/080370
§ 371 (c)(1),
(2) Date: May 21, 2014

(87) PCT Pub. No.: WO2013/077427
PCT Pub. Date: May 30, 2013

(65) Prior Publication Data
US 2014/0318676 A1    Oct. 30, 2014

(30) Foreign Application Priority Data

Nov. 22, 2011 (JP) ................................. 2011-255595

(51) Int. Cl.
*B60C 11/11* (2006.01)
*B60C 11/03* (2006.01)
*B60C 11/13* (2006.01)

(52) U.S. Cl.
CPC ......... *B60C 11/0306* (2013.04); *B60C 11/0304* (2013.04); *B60C 11/11* (2013.01);
(Continued)

(58) Field of Classification Search
CPC  B60C 11/01; B60C 11/1384; B60C 11/0306; B60C 11/1392

USPC ......................................... 152/209.15, 209.21
See application file for complete search history.

(56) References Cited

U.S. PATENT DOCUMENTS 6,138,728 A * 10/2000 Miyazaki ................. 152/209.15
6,182,726 B1 * 2/2001 Nakamura ............... 152/209.15
(Continued)

FOREIGN PATENT DOCUMENTS

CN     2130141 Y    4/1993
EP     0895876 A2   2/1999
(Continued)

OTHER PUBLICATIONS

International Search Report for PCT/JP2012/080370, dated Jan. 22, 2013.
(Continued)

*Primary Examiner* — Steven D Maki
*Assistant Examiner* — Robert Dye
(74) *Attorney, Agent, or Firm* — Sughrue Mion, PLLC

(57) ABSTRACT

The tire includes a tread portion to come into contact with a road surface. A lateral groove portion extending in a direction intersecting with a tire circumferential direction, and a land portion partitioned by the lateral groove portion are formed in the tread portion. The land portion includes: a ground-contact face to come into contact with the road surface; a side face formed on an outer side in a tread width direction of the land portion; a lateral groove face constituting a groove wall of the lateral groove portion formed on one end in the tire circumferential direction of the land portion; and a tapered face which meets the ground-contact face, the side face, and the lateral groove face in a corner portion formed by the ground-contact face, the side face, and the lateral groove face.

5 Claims, 14 Drawing Sheets

(52) U.S. Cl.
CPC ......... B60C11/1384 (2013.04); B60C 11/1392 (2013.04); *B60C 2011/013* (2013.04); *B60C 2200/065* (2013.04)

(56) References Cited

U.S. PATENT DOCUMENTS

| | | | | |
|---|---|---|---|---|
| 7,281,554 | B2 * | 10/2007 | Takahashi | 152/209.15 |
| 2006/0048876 | A1 * | 3/2006 | Yamane et al. | 152/209.24 |
| 2010/0212792 | A1 | 8/2010 | Mita | |
| 2011/0277895 | A1 * | 11/2011 | Takahashi | 152/209.18 |

FOREIGN PATENT DOCUMENTS

| | | | |
|---|---|---|---|
| EP | 1036674 | * | 9/2000 |
| EP | 2230102 | A1 | 9/2010 |
| JP | 03-182813 | A | 8/1991 |
| JP | 06-024211 | * | 2/1994 |
| JP | 06-305306 | A | 11/1994 |
| JP | 10-278512 | A | 10/1998 |
| JP | 11-263104 | A | 9/1999 |
| JP | 11-334320 | * | 12/1999 |
| JP | 2001-180227 | * | 7/2001 |
| JP | 2003-025810 | A | 1/2003 |
| JP | 2003-205706 | A | 7/2003 |
| JP | 2004-058753 | A | 2/2004 |
| JP | 2004-276861 | * | 10/2004 |
| JP | 2010-115973 | A | 5/2010 |
| JP | 2011-105041 | A | 6/2011 |

OTHER PUBLICATIONS

Japanese Office Action, 2013-545971, dated Feb. 18, 2014.
Communication dated Nov. 25, 2014, issued by the State Intellectual Property Office of the People's Republic of China in counterpart Application No. 201280057266.9.
Communication dated May 29, 2015 from the European Patent Office in counterpart application No. 12850897.5.

* cited by examiner

FIG. 11
(a) OUTLINE OF SIMULATION MODEL
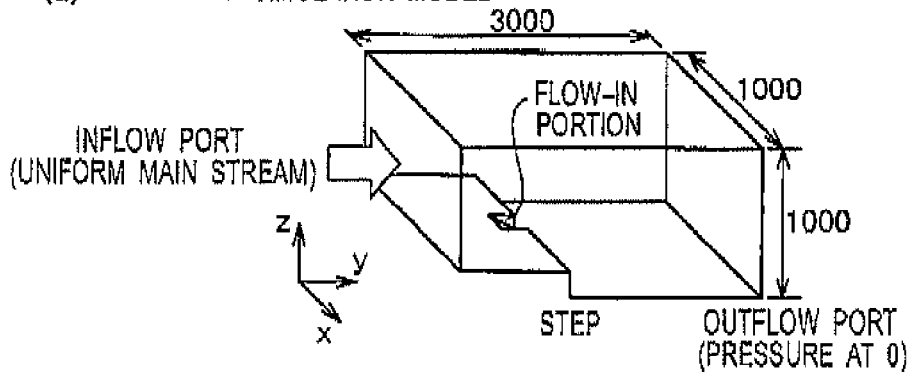
(b) DETAILED DIAGRAM OF STEP PORTION AND ITS VICINITY
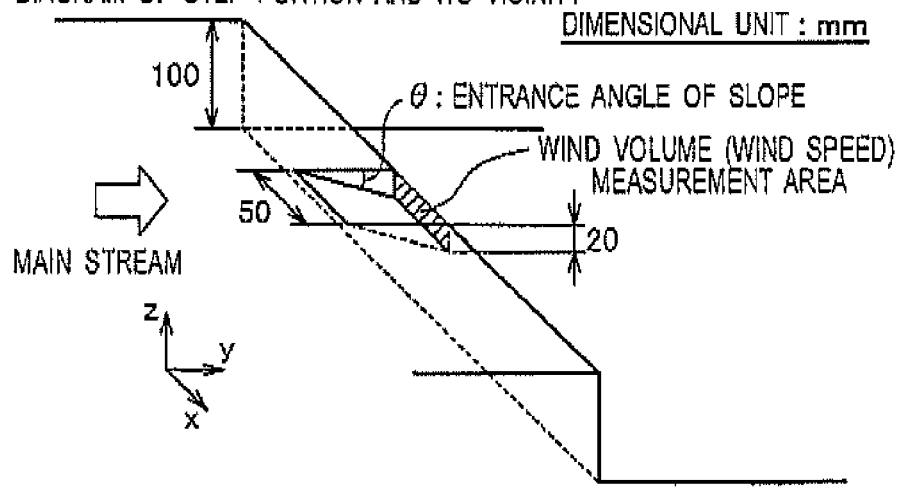
(c) RESULTS
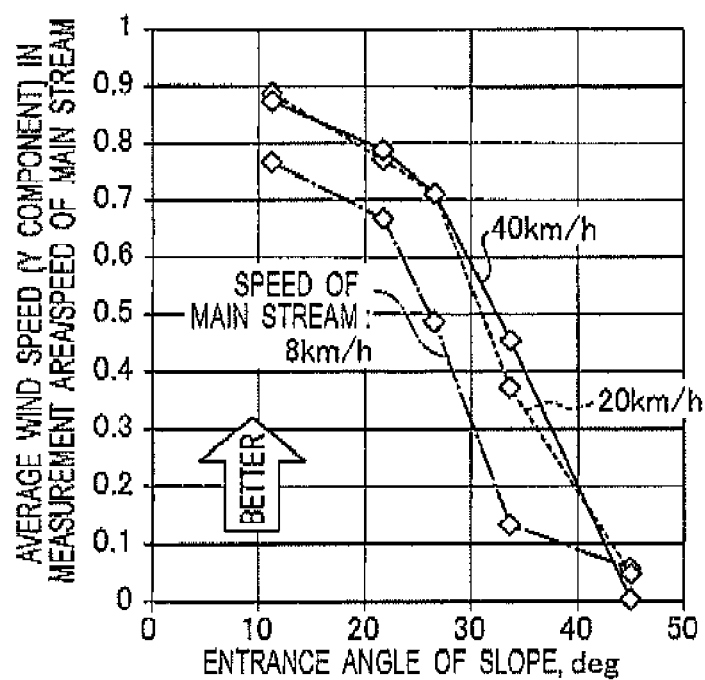

FIG. 12
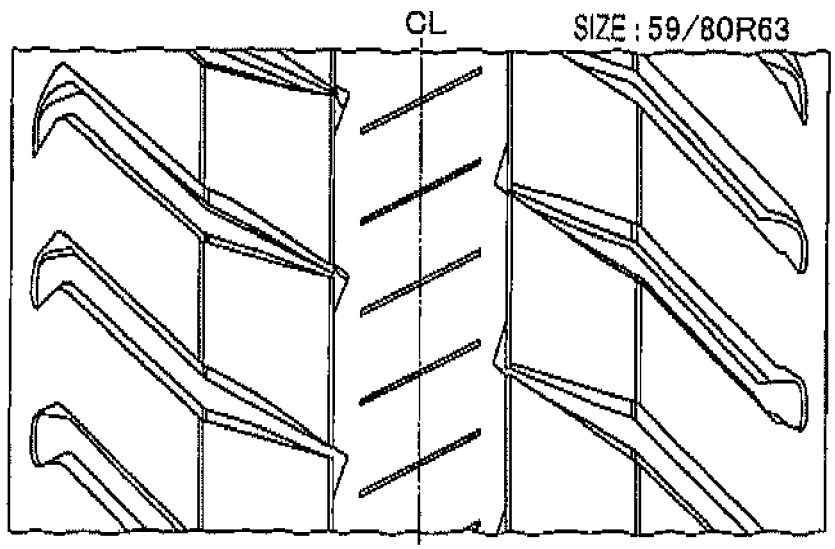
(a) CONVENTIONAL EXAMPLE: WITHOUT TAPERED FACE
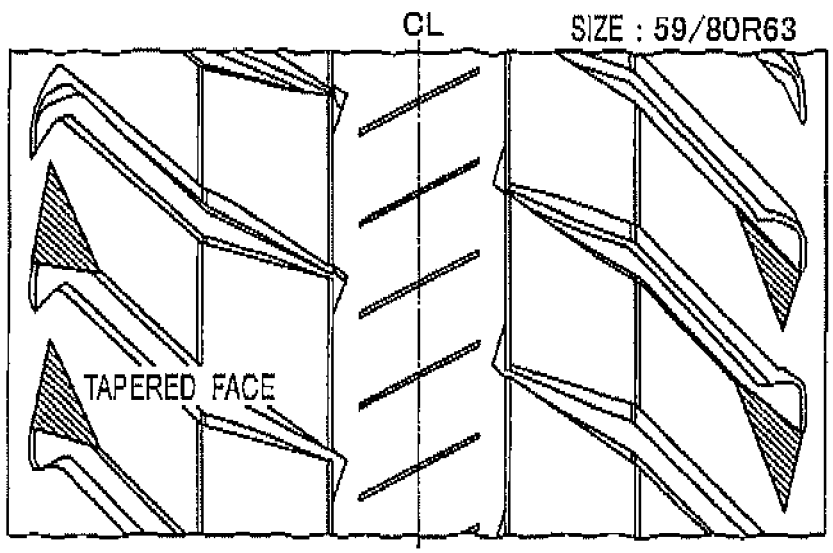
(b) EXAMPLE 1: WITH TAPERED FACE

TIRE

CROSS REFERENCE TO RELATED APPLICATIONS

This application is a National Stage of International Application No. PCT/JP2012/080370 filed Nov. 22, 2012, claiming priority based on Japanese Patent Application No. 2011-255595 filed Nov. 22, 2011, the contents of all of which are incorporated herein by reference in their entirety.

TECHNICAL FIELD

The present invention relates to a tire having a tread portion to come into contact with a road surface.

BACKGROUND ART

A rubber material having viscoelasticity exhibits a hysteresis behavior. Accordingly, a tread portion of a tire generates heat as a consequence of repeating deformations and contractions associated with rolling motions. An increase in an amount of the rubber material constituting the tread portion leads to an increase in a hysteresis loss attributed to bending deformations and shearing deformations during rolling motions of the tire. For this reason, the tire having the tread portion with a larger thickness tends to become higher in temperature. In particular, a large tire employed for a large vehicle used in a mine, a construction site or the like has a characteristic that the tire is prone to generate heat because such large tire not only requires a large amount of the rubber material used therein but also is used in a heavily loaded state, on bad road surfaces, and under severe traction conditions, thereby repeating deformations and contractions. If the tire reaches a high temperature while the vehicle is traveling, such a rise in temperature causes problems such as detachment (separation) of the rubber material constituting the tread portion from belt layers, and leads to shortening a replacement cycle of the tire.

Accordingly, there has heretofore been known a method in which sub-grooves are formed in a tread portion in a tread width direction, whereby an amount of a rubber material as a heat generation source is reduced and a surface area of the tread portion is increased so as to promote heat radiation from the tread portion (PTL 1, for example).

CITATION LIST

Patent Literature

[PTL 1] Japanese Patent Application Publication No. 2003-205706, FIG. 1, etc.

SUMMARY OF INVENTION

However, the conventional tire has the following problems. Specifically, although the heat radiation can be promoted by forming lateral groove portions (the sub-grooves) intersecting with a tire circumferential direction and thereby increasing an area of the grooves, such an increase in the area of the grooves lead to a deterioration in rigidity and a deterioration in abrasion resistance of the tread portion. Since the heat radiation performance of the tire and the rigidity of the tire are in a trade-off relationship, there is a limitation in securing the heat radiation performance by increasing the area of the grooves.

In view of the above, it is an object of the present invention to provide a tire which is capable of reliably enhancing a heat radiation performance without impairing rigidity and abrasion resistance of a tread portion.

For the purpose of solving the foregoing problems, a tire (pneumatic tire 1) of a first feature of the present invention includes a tread portion (tread portion 13) to come into contact with a road surface. The gist is as follows. A lateral groove portion (lateral groove 40A) extending in a direction intersecting with a tire circumferential direction, and a land portion (land portion block 100) partitioned by the lateral groove portion are formed in the tread portion. The land portion includes: a ground-contact face (ground-contact face 100S) to come into contact with the road surface; a side face (side face 101) formed on an outer side in a tread width direction of the land portion; a lateral groove face (lateral groove face 103) constituting a groove wall of the lateral groove portion formed on one end in the tire circumferential direction of the land portion; and a tapered face (tapered face 100R) which meets the ground-contact face, the side face, and the lateral groove face in a corner portion (corner portion 100A) formed by the ground-contact face, the side face, and the lateral groove face.

BRIEF DESCRIPTION OF DRAWINGS

FIG. 11($a$) is a perspective view showing an outline of a simulation model in Comparative Evaluation 1 of the present invention, FIG. 11($b$) is an enlarged perspective view showing the outline of the simulation model in Comparative Evaluation 1 of the present invention, and FIG. 11($c$) is a graph showing results of the simulation model in Comparative Evaluation 1 of the present invention.

FIG. 12($a$) is an enlarged view showing a tread portion of a pneumatic tire of Conventional Example in Comparative Evaluation 2 of the present invention viewed from a tread side, and FIG. 12($b$) is an enlarged view showing a tread portion of a pneumatic tire of Example in Comparative Evaluation 2 of the present invention viewed from a tread side.

DESCRIPTION OF EMBODIMENTS

An embodiment of a pneumatic tire 1 according to the present invention will be described with reference the drawings. Specifically, descriptions will be provided for (1) Configuration of Pneumatic Tire, (2) Configuration of Land Portions, (3) Operation and Effects, and (4) Modified Example.

In the following descriptions of the drawings, identical or similar components are denoted by identical or similar reference signs. It is to be noted, however, that the drawings are merely schematic and dimensional ratios and the like are different from actual ones. Specific dimensions and the like are therefore to be determined in consideration of the following descriptions. In addition, dimensional relations and ratios may vary among the drawings.

(1) Configuration of Pneumatic Tire

Figure 1:
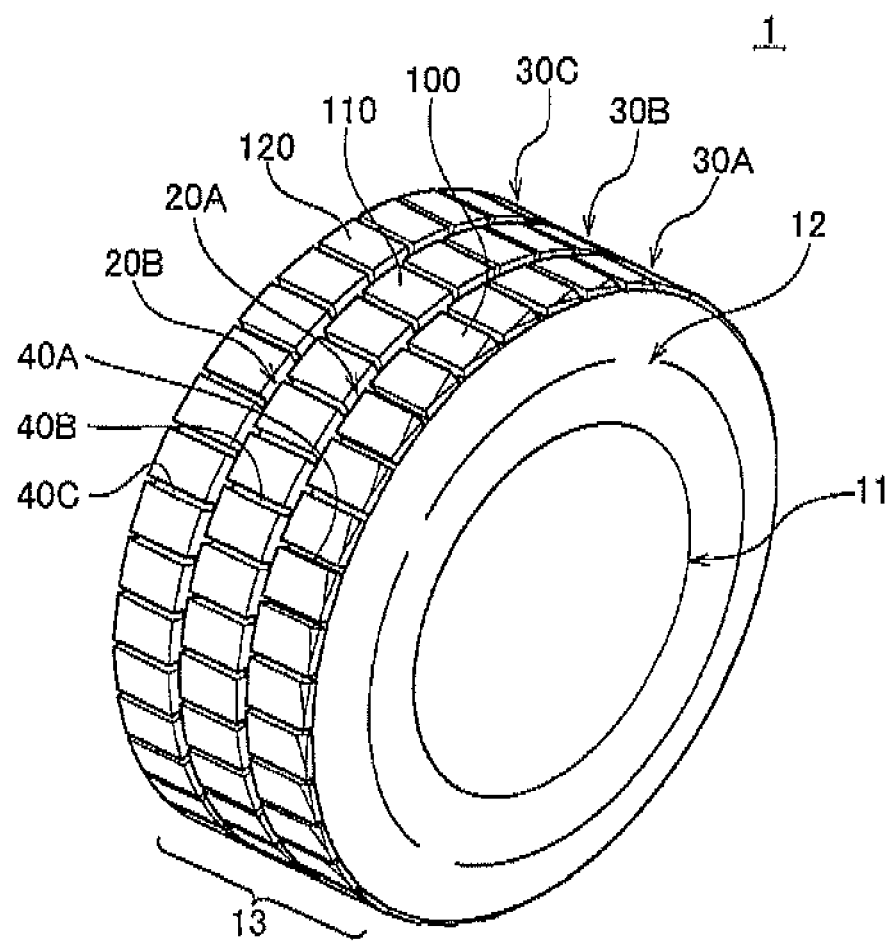
FIG. 1 is a perspective view of a pneumatic tire of an embodiment.
Figure 2:
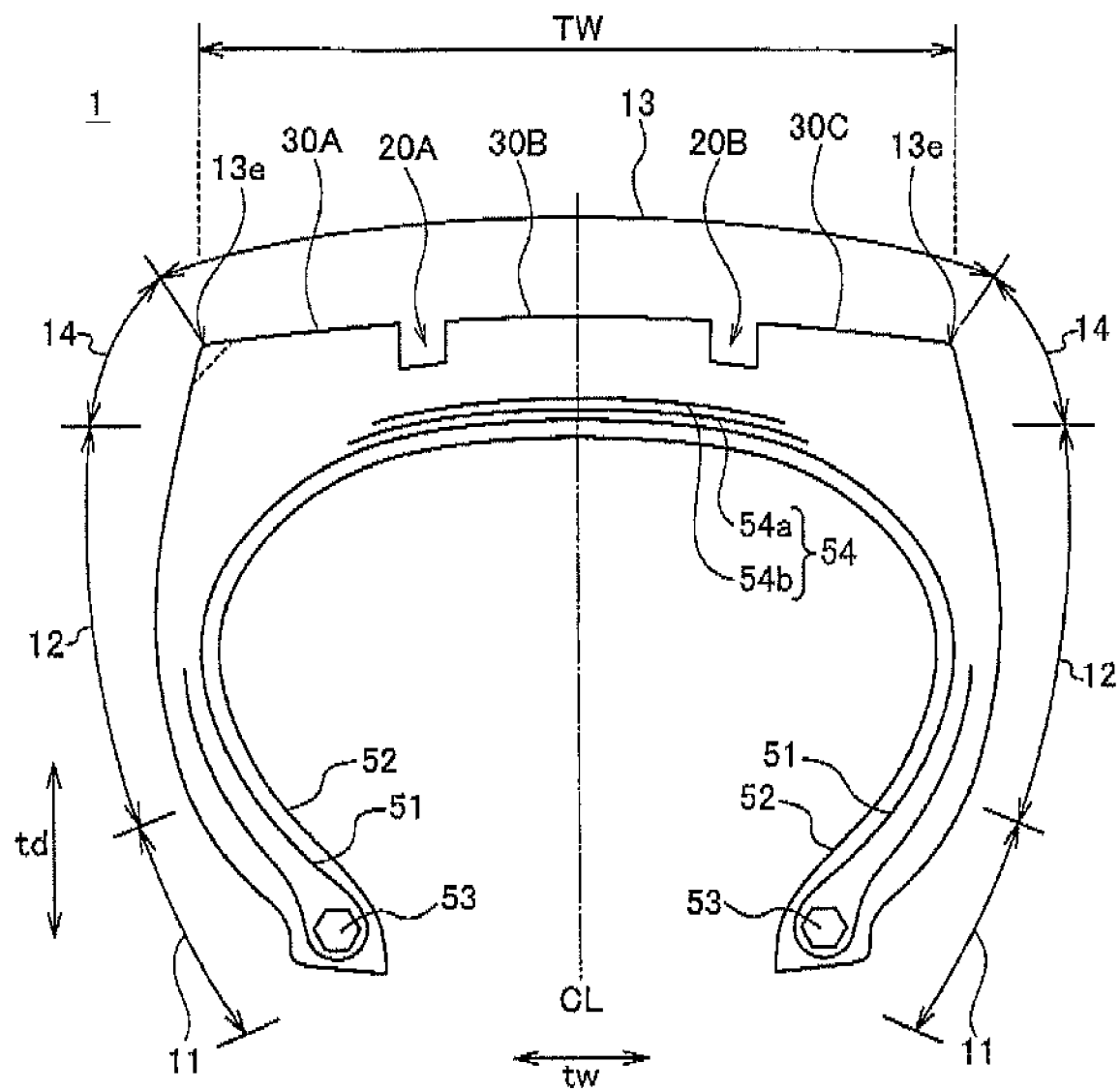
FIG. 2 is a cross-sectional view of the pneumatic tire of the embodiment, which is taken along a tread width direction and a tire diametrical direction.

FIG. 1 is a perspective view of a pneumatic tire 1 of an embodiment. FIG. 2 is a cross-sectional view of the pneumatic tire 1, which is taken along a tread width direction tw and a tire diametrical direction td. The pneumatic tire 1 of the embodiment may be filled with an inert gas such as a nitrogen gas instead of air.

As shown in FIG. 1, the pneumatic tire 1 includes bead portions 11 to come into contact with a rim, side wall portions 12 constituting side faces of the tire, a tread portion 13 to come into contact with a road surface, and buttress portions 14 each located between the corresponding side wall portion 12 and the tread portion 13.

The buttress portions 14 are portions located on an extension in the tire diametrical direction of the side wall portions 12 and continuous with to side faces of the tread portion 13. Each buttress portion 14 extends inward in the tire diametrical direction td from a tread end portion 13e located on an outside in the tread width direction tw of the tread portion 13. An inner position of the buttress portion 14 in the tire diametrical direction td is equivalent to the innermost side in the tire diametrical direction td of each position at which a corresponding lateral groove (lateral groove 40A) opens in the tread end portion 13e. The buttress portions 14 are the portions which do not come into contact with the ground during normal traveling.

Circumferential grooves 20A and 20B extending in a tire circumferential direction tc are formed in the tread portion 13. Circumferential land portions 30A, 30B, and 30C partitioned by the circumferential grooves 20A and 20B are also formed therein.

The lateral grooves 40A extending in a direction intersecting with the tire circumferential direction tc are formed in the circumferential land portion 30A. Lateral grooves 40B extending in a direction intersecting with the tire circumferential direction tc are formed in the circumferential land portion 30B. Lateral grooves 40C extending in a direction intersecting with the tire circumferential direction tc are formed in the circumferential land portion 30C. In the embodiment, land-portion blocks 100, 110, and 120 are formed by segmenting the circumferential land portions 30A, 30B, and 30C by the lateral grooves 40A, 40B, and 40C. In addition, the lateral grooves 40A, 40B, and 40C communicate with the circumferential grooves 20A and 20B. Here, the lateral grooves 40A are open to the tread end portion 13e.

The pneumatic tire 1 includes a carcass layer 51 which constitutes a framework of the pneumatic tire 1. An inner liner 52 that is a highly airtight rubber layer corresponding to a tube is provided on the inside in the tire diametrical direction td of the carcass layer 51. Two ends of the carcass layer 51 are supported by a pair of beads 53.

Belt layers 54 are disposed on the outside in the tire diametrical direction td of the carcass layer 51. The belt layers 54 include a first belt layer 54a and a second belt layer 54b, which are formed by covering steel cords with rubber. The steel cords constituting each of the first belt layer 54a and the second belt layer 54b are arranged at a given angle to a tire equator line CL. The tread portion 13 is disposed on the outside in the tire diametrical direction td of the belt layers 54 (the first belt layer 54a and the second belt layer 54b).

A width between two end portions (the tread end portions 13e) of the tread portion 13 of the pneumatic tire 1 will be denoted by TW. In the embodiment, the two ends of the tread portion 13 represent two ends in the tread width direction tw of a ground contact area in a state where the tire is in contact with the road surface. The state where the tire is in contact with the road surface means, for example, a state where the tire is attached to a normal rim, and a normal internal pressure and a normal load are applied to the tire. Here, the normal rim means a standard rim for an applicable size determined in JATMA (The Japan Automobile Tyre Manufactures Association, Inc.) Year Book 2008. The normal internal pressure means a pneumatic pressure corresponding to a maximum load capacity according to JATMA Year Book 2008. The normal load means a load equivalent to the maximum load capacity in the case of adoption of a single wheel according to JATMA Year Book 2008. Outside Japan, standards for defining the above parameters are determined by industrial standards which are effective in regions where applicable tires are manufactured or used. Such standards include "The Tire and Rim Association Inc. Year Book" in the United States of America, and "The European Tire and Rim Technical Organization Standards Manual" in Europe, for example.

In the embodiment, the pneumatic tire 1 is assumed to be, for example, a radial tire having an aspect ratio of 80% or less, a rim diameter of 57" or greater, a load bearing capacity of 60 mtons or greater, and a load factor (k-factor) of 1.7 or greater. Note that the pneumatic tire 1 is not limited only to the foregoing.

(2) Configuration of Land Portions

Figure 3:
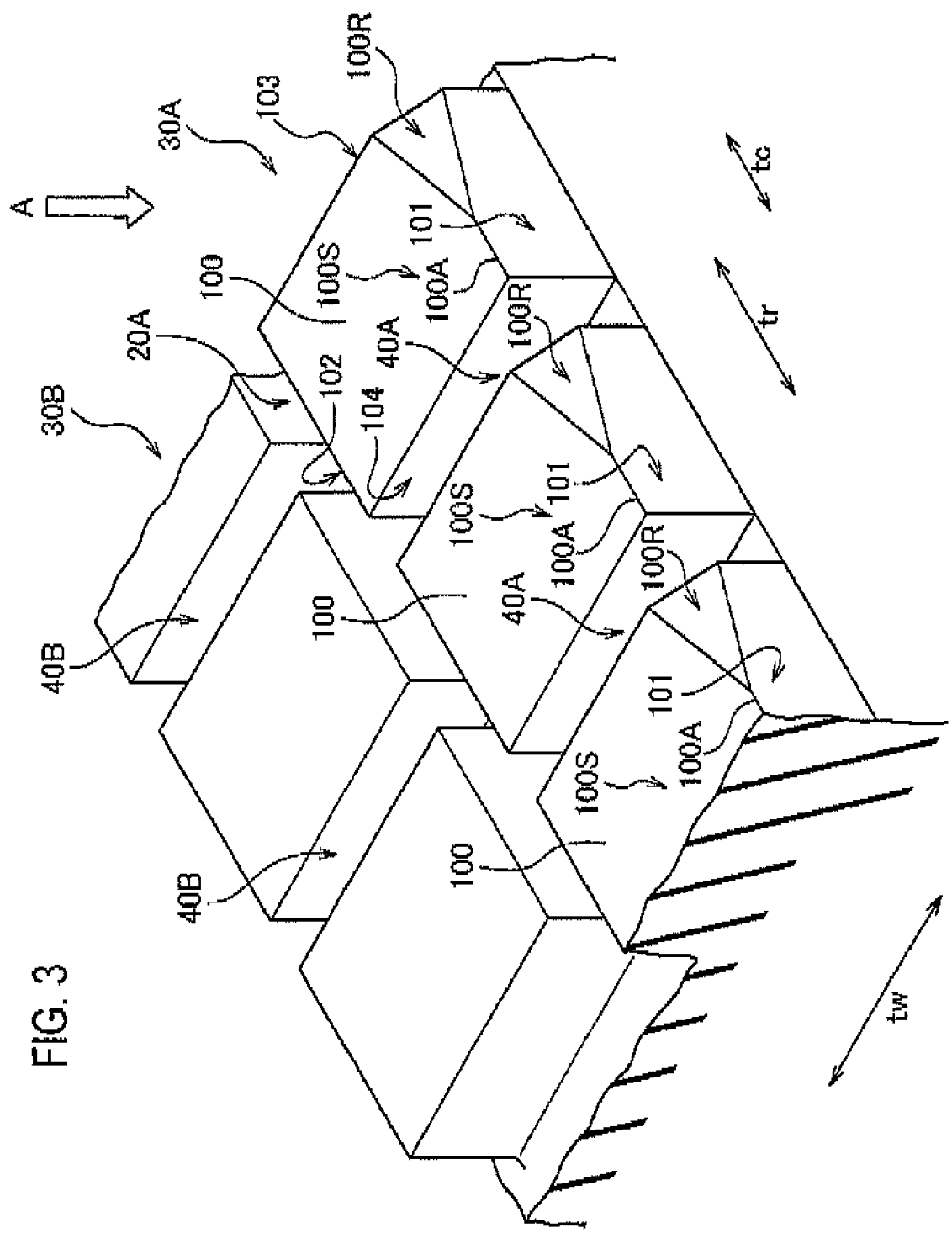
FIG. 3 is an enlarged perspective view showing a tread portion of the pneumatic tire in an enlarged manner.
Figure 4:
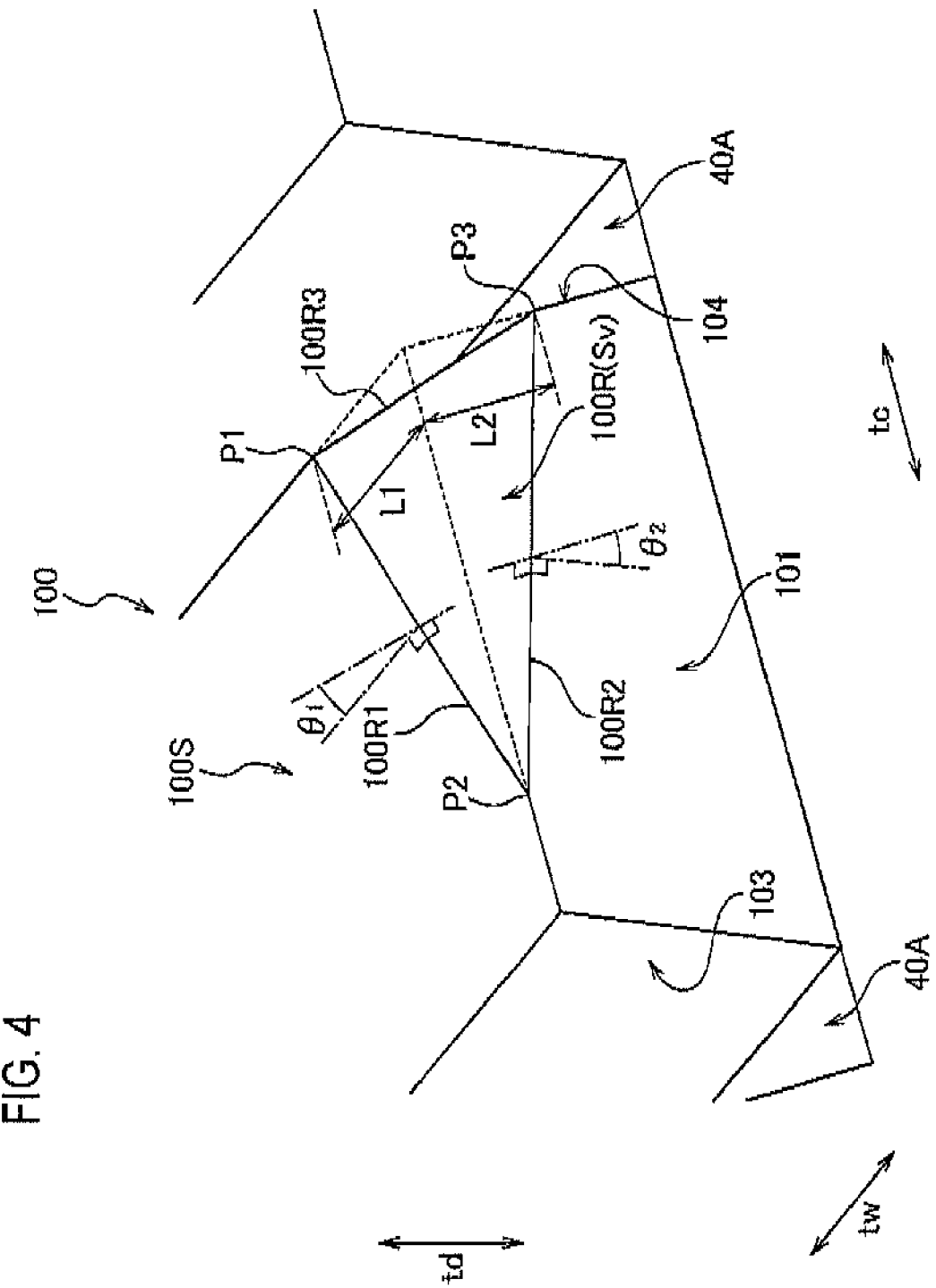
FIG. 4 is an enlarged perspective view showing a land-portion block of the pneumatic tire in an enlarged manner.
Figure 5:
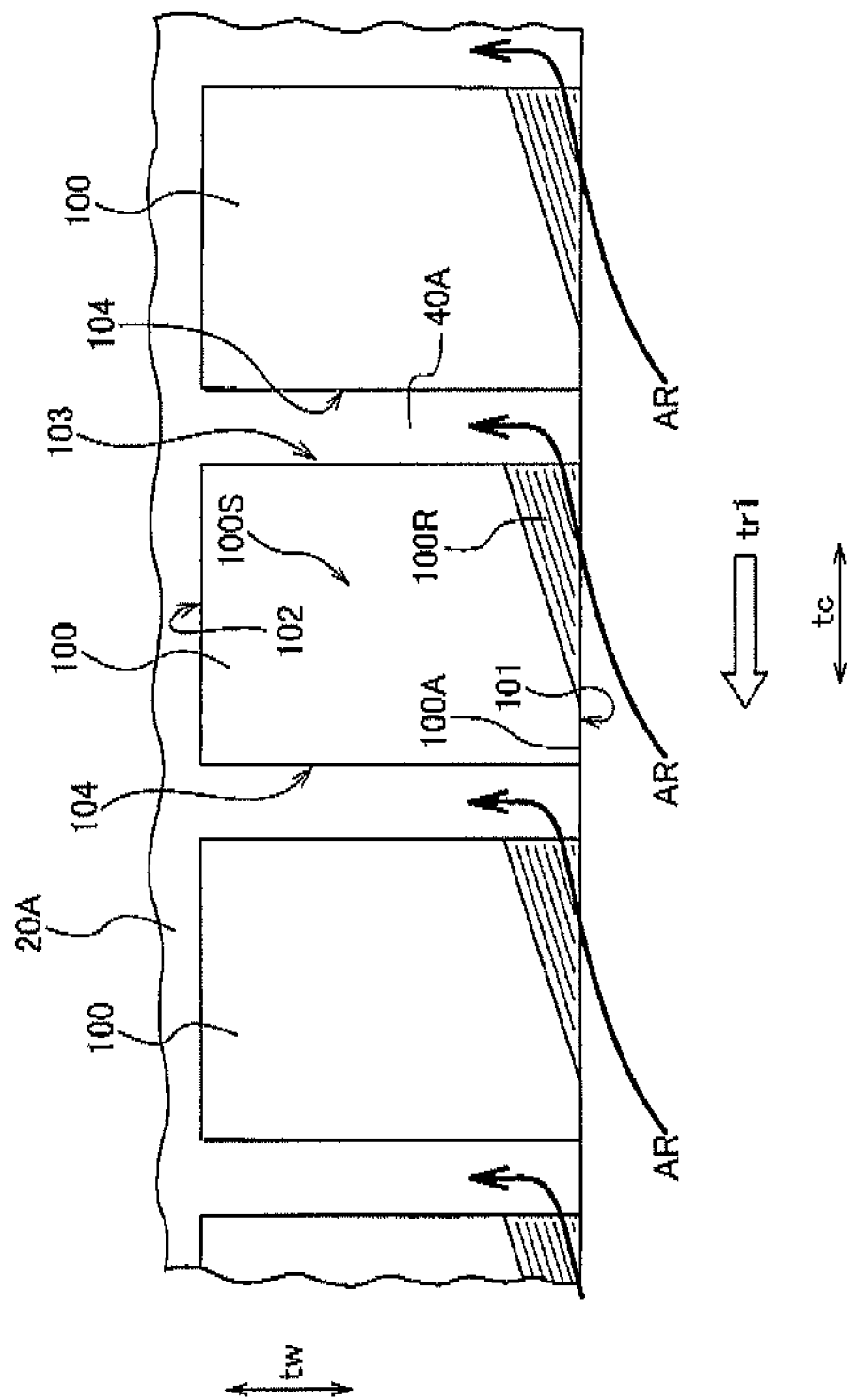
FIG. 5 is a plan view of the tread portion which is viewed from a direction of an arrow A in FIG. 3.
Figure 6:
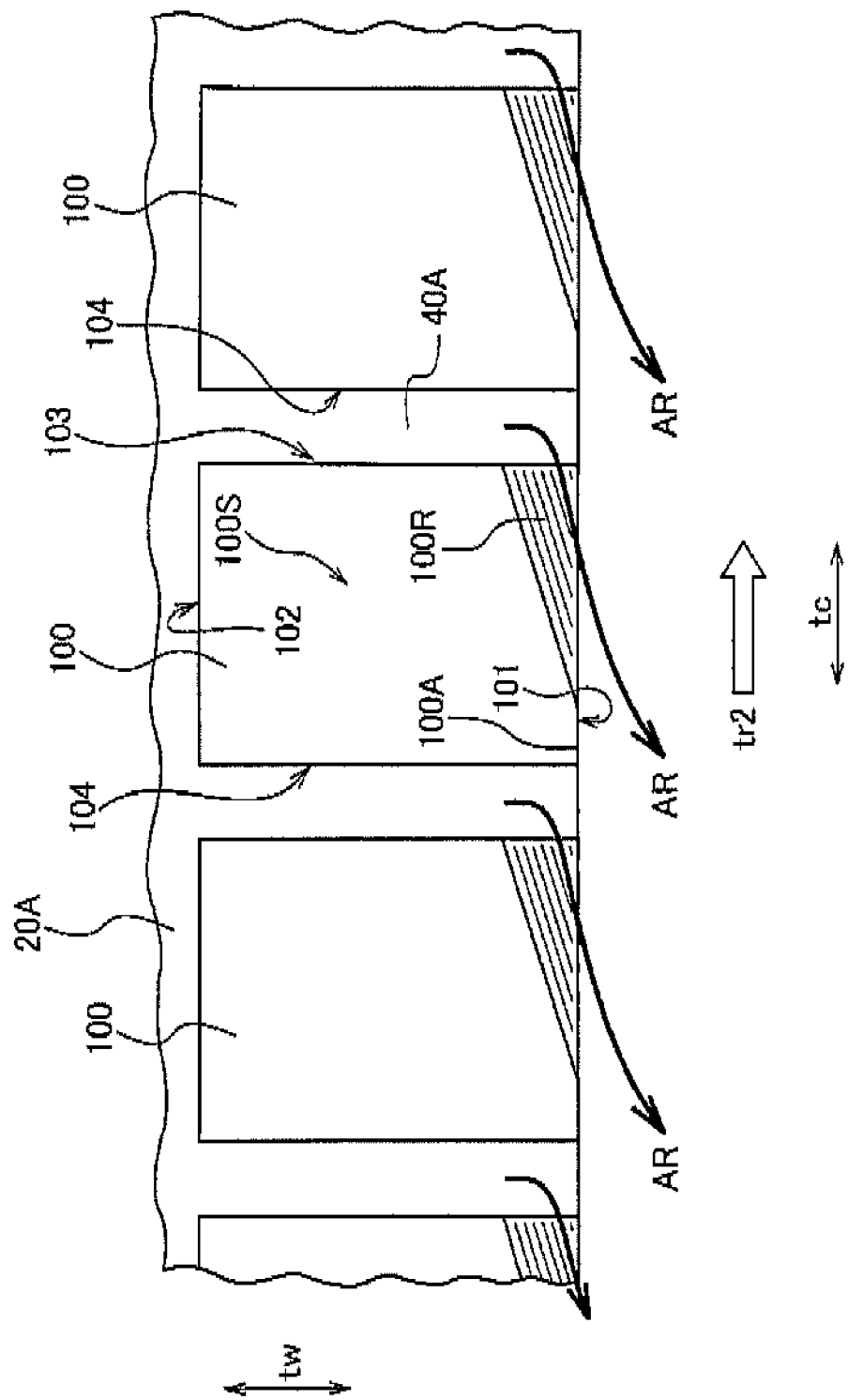
FIG. 6 is a plan view of the tread portion which is viewed from the direction of the arrow A in FIG. 3.

FIG. 3 is an enlarged perspective view showing the tread portion 13 of the pneumatic tire 1 in an enlarged manner. FIG. 4 is an enlarged perspective view showing a land-portion block 100 in an enlarged manner. FIG. 5 and FIG. 6 are plan views of land-portion blocks which are viewed from a direction of an arrow A in FIG. 3.

Each land-portion block 100 is formed by partitioning the circumferential land portion 30A with the lateral grooves 40A. The land-portion block 100 includes: a ground-contact face 100S which comes into contact with a road surface; a side face 101 formed on an outer side in the tread width direction tw of the land-portion block 100; a side face 102 located on an inner side in the tread width direction tw of the land-portion block 100; a lateral groove face 103 forming a groove wall of the lateral groove 40A formed on one side in the tire circumferential direction tc of the land-portion block 100; and a lateral groove face 104 forming a groove wall of the lateral groove 40A formed on another side in the tire circumferential direction tc of the land-portion block 100. In addition, the land-portion block 100 includes a tapered face 100R which meets the ground-contact face 100S, the side face 101, and the lateral groove face 103 at a corner portion 100A formed by the ground-contact face 100S, the side face 101, and the lateral groove face 103. Here, the corner portion 100A constitutes the tread end portion 13e of the tread portion 13 described above.

The side face 101 is formed on the buttress portion 14 side of the land-portion block 100. The side face 101 extends in the tire circumferential direction tc. The side face 101 is continuous with the lateral groove faces 103 and 104 of the land-portion block 100, which constitute the groove walls of the lateral grooves 40A. The side face 102 is formed to be located opposite from the side face 101 in the tread width direction tw. The side face 102 constitutes a groove wall of the circumferential groove 20A which is adjacent to an inner side in the tread width direction tw of the land-portion block 100.

The lateral groove face 103 extends in the tread width direction tw. The lateral groove face 103 is located on the one side in the tire circumferential direction tc of the land-portion block 100. The lateral groove face 104 extends in the tread width direction tw. The lateral groove face 104 is located on the other side in the tire circumferential direction tc of the land-portion block 100.

The tapered face 100R extends in the tire circumferential direction tc in the corner portion 100A formed by the ground-contact face 100S and the side face 101. The tapered face 100R becomes inclined inward in the tire diametrical direction td to the one side of the tire circumferential direction tc in the light of a cross section in the tire circumferential direction tc and the tire diametrical direction td of the land-portion block 100. The tapered face 100R also becomes inclined inward in the tire diametrical direction td to the outside of the tread width direction tw in the light of a cross section in the tread width direction tw and the tire diametrical direction td of the land-portion block 100.

Specifically, the tapered face 100R is formed in such a way as to chamfer a vertex where the ground-contact face 100S, the side face 101, and the lateral groove face 103 meet. In other words, the tapered face 100R is formed in such a way as to have at least one side on each of the ground-contact face 100S, the side face 101, and the lateral groove face 103.

Of the side face 101 and the side face 102 in the tread width direction Tw of the land-portion block 100, the tapered face 100R has the side on the side face 101 but does not have a side on the side face 102. That is, of the side face 101 and the side face 102 of the land-portion block 100 located opposite from each other in the tread width direction Tw, the other one (the side face 102) does not meet the tapered face 100R.

Further, of the lateral groove face 103 and the lateral groove face 104 in the tire circumferential direction Tc of the land-portion block 100, the tapered face 100R has the side on the lateral groove face 103 but does not have a side on the lateral groove face 104. That is, of the lateral groove face 103 and the lateral groove face 104 of the land-portion block 100 located opposite from each other in the tire circumferential direction Tc, the other (the lateral groove face 104) does not meet the tapered face 100R.

By forming the tapered face 100R as described above, the air flowing along the tapered face 100R during rotation of the pneumatic tire 1 is more likely to collide with the lateral groove face 104 of another land-portion block 100 which is adjacent in the tire circumferential direction Tc. In other words, the air flowing along the tapered face 100R is more likely to be caught in the lateral groove 40A which is adjacent to the land-portion block 100 in the tire circumferential direction Tc.

In the embodiment, the shape of the tapered face 100R is a planar shape. Specifically, the tapered face 100R has such a shape that extends linearly in the light of the cross section in the tire circumferential direction tc and the tire diametrical direction td or in the light of the cross section in the tread width direction tw and the tire diametrical direction td.

In addition, as shown in FIG. 4, when assuming a plane Sv that passes: a vertex P2 where the tapered face 100R, the ground-contact face 100S, and the side face 101 meet; a vertex P1 where the tapered face 100R, the ground-contact face 100S, and the lateral groove face 103 meet; and a vertex P3 where the tapered face 100R, the side face 101, and the lateral groove face 104 meet, an angle θ1 defined between the plane Sv and the ground-contact face 100S is in a range of 0°<θ1<45°. Alternatively, an angle θ2 defined between the plane Sv and the side face 101 is in a range of 0°<θ2<45°. In other words, only one of the angle θ1 and the angle θ2 needs to be in the range of 0°<θ1 (or θ2)<45°. More preferably, the angle θ1 (or the angle θ2) is in a range of 10°<θ1 (or θ2)<30°. In the embodiment, since the shape of the tapered face 100R is the planar shape, the tapered face 100R and the plane Sv are the same plane.

Meanwhile, as shown in FIG. 4, the angle θ1 can be translated as an angle defined between a straight line extending parallel to the tapered face 100R (the plane Sv) and being orthogonal to an end portion 100R1 formed by the tapered face 100R and the ground-contact face 100S, and a straight line extending parallel to the ground-contact face 100S and being orthogonal to the end portion 100R1. Further, the angle θ1 can also be referred to as an inclination angle of the tapered face 100R (the plane Sv) to the ground-contact face 100S. It should be noted that in the embodiment, the end portion 100R1 is located on a straight line on the plane Sv, the line joining the vertex P1 and the vertex P2.

In the meantime, the angle θ2 can be translated as an angle defined between a straight line extending parallel to the tapered face 100R (the plane Sv) and being orthogonal to an end portion 100R2 formed by the tapered face 100R and the side face 101, and a straight line extending parallel to the side face 101 and being orthogonal to the end portion 100R2. Further, the angle θ2 can also be referred to as an inclination angle of the tapered face 100R (the plane Sv) to the side face 101. In the embodiment, the end portion 100R2 is located on a straight line on the plane Sv, the line joining the vertex P2 and the vertex P3.

The tapered face 100R is preferably formed in such a way that an interval L2 between the vertex P1 and the vertex P3 in the tire diametrical direction td is longer than an interval L1 between the vertex P1 and the vertex P2 in the tread width direction tw. This is due to the following reason. Specifically, by setting the interval L2 longer than the interval L1, the tapered face 100R is likely to remain longer even when wear of the land-portion block 100 from the ground-contact face 100S progresses. In short, sustainability of effects of the tapered face 100R can be enhanced. Here, it is more preferable that the interval L2 be equal to or above 50 mm.

(3) Operation and Effects

In the pneumatic tire 1, the land-portion block 100 includes the tapered face 100R in the corner portion 100A formed by the ground-contact face 100S and the side face 101 located outside in the tread width direction tw and in such a way as to meet the ground-contact face 100S, the side face 101, and the lateral groove face 103.

For this reason, as shown in FIG. 5, when the pneumatic tire 1 rotates in a rotational direction tr1, an air flow (a relative wind) AR in a direction opposite the rotational direction tr1, which occurs relative to the rotation of the pneumatic tire 1, collides with the lateral groove face 104 of the land-portion block 100 disposed downstream in the rotational direction, and the air flow AR is guided to the corresponding lateral groove 40A. Hence, the air flow AR from the side face 101 of the land-portion block 100 to the lateral groove 40A is created as a consequence. In other words, the air around the pneumatic tire 1 is taken into the lateral groove 40A so that a flow volume of the air flowing in the lateral groove 40A can be increased. Thus, in the pneumatic tire 1, a heat transfer coefficient inside each lateral groove 40A is enhanced so that a temperature of each land-portion block 100 can be reduced. Furthermore, it is possible to reduce a temperature of the tread portion 13.

Meanwhile, as shown in FIG. 6, when the pneumatic tire 1 rotates in a rotational direction tr2, an air flow (a relative wind) AR flowing along the side face 101 is created by the rotation of the pneumatic tire 1. Hence, a discharge of the air from the corresponding lateral groove 40A to the outside in the tread width direction tw is promoted, so that the flow volume of the air flowing in the lateral groove 40A can be increased. Thus, the heat transfer coefficient inside each lateral groove 40A is enhanced so that the temperature of each land-portion block 100 can be reduced. Furthermore, it is possible to reduce the temperature of the tread portion 13.

As described above, the pneumatic tire 1 of the embodiment can enhance a heat radiation performance without using methods of conventional techniques such as increasing the area of the grooves. In other words, the pneumatic tire 1 can enhance the heat radiation performance without impairing rigidity and abrasion resistance of the tread portion.

Meanwhile, in the pneumatic tire 1, the angle θ1 defined between the plane Sv passing the vertices P1 to P3 of the tapered face 100R and the ground-contact face 100S is in the range of 0°<θ1<45°. Alternatively, the angle θ2 defined between the plane Sv and the side face 101 is in the range of 0°<θ2<45°.

If the angle θ1 (or θ2) becomes equal to or above 45°, the air flowing over a surface of each tapered face 100R is likely to be detached therefrom, and the flow volume of the air flowing in each lateral groove 40A is hardly increased. In other words, it is possible to further reduce the temperature of the tread portion 13 by setting the angle θ1 (or θ2) within the above-mentioned range. Here, a description of a case where the angle θ1 (or θ2) is equal to or below 0° will be omitted because that is the case where no tapered face 100R is formed.

Meanwhile, in the pneumatic tire 1 of the embodiment, each lateral groove 40A communicates with the circumferential groove 20A. Accordingly, the air taken into the lateral groove 40A or the air discharged from the lateral groove 40A circulates in the tire circumferential direction tc inside the circumferential groove 20A. Thus, it is possible to further reduce the temperature of the tread portion 13.

Further, in the pneumatic tire 1 of the embodiment, the shape of the tapered face 100R is the planar shape. According to the pneumatic tire 1 thus configured, the air flowing along the tapered face 100R can be made less likely to be detached than in a case where the shape of the tapered face 100R is formed into such a shape projecting to an outer side of the land-portion block 100. On the other hand, reduction in volume of the land-portion block 100 can be suppressed as compared to a case where the shape of the tapered face 100R is formed into such a shape recessed to an inner side of the land-portion block 100. Accordingly, the pneumatic tire 1 can suppress reduction in its wear life and ensure rigidity of its land-portion blocks 100 as well.

Moreover, in the pneumatic tire 1 of the embodiment, each tapered face 100R is formed on the buttress portion 14 side of the land-portion block 100. Specifically, the tapered face 100R is formed on the outermost side of the tread portion 13 in the tread width direction tw. The pneumatic tire 1 thus configured can take the air flowing along surfaces of the buttress portions 14 of the pneumatic tire 1 into the lateral grooves 40A. In other words, even when the temperature of the tread portion 13 is increased due to the rotation of the tire, the air having the lower temperature than that of the tread portion 13 can be taken into the tread portion 13. Thus, the temperature of the tread portion 13 can be more efficiently reduced.

(4) Modified Example

Figure 7:
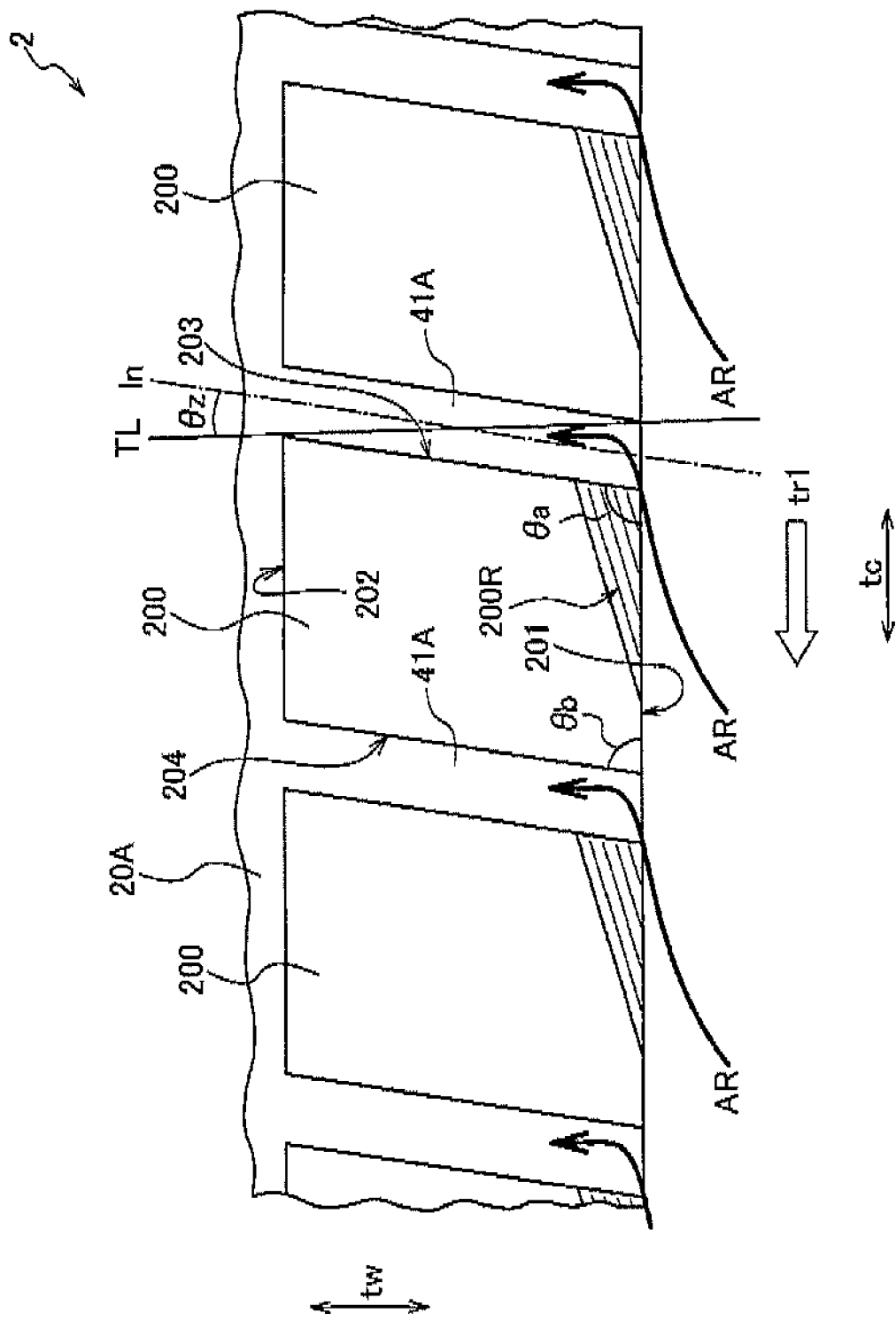
FIG. 7 is a plan view of a pneumatic tire shown as a modified example of the embodiment, which is viewed from a direction perpendicular to its tread portion.
Figure 8:
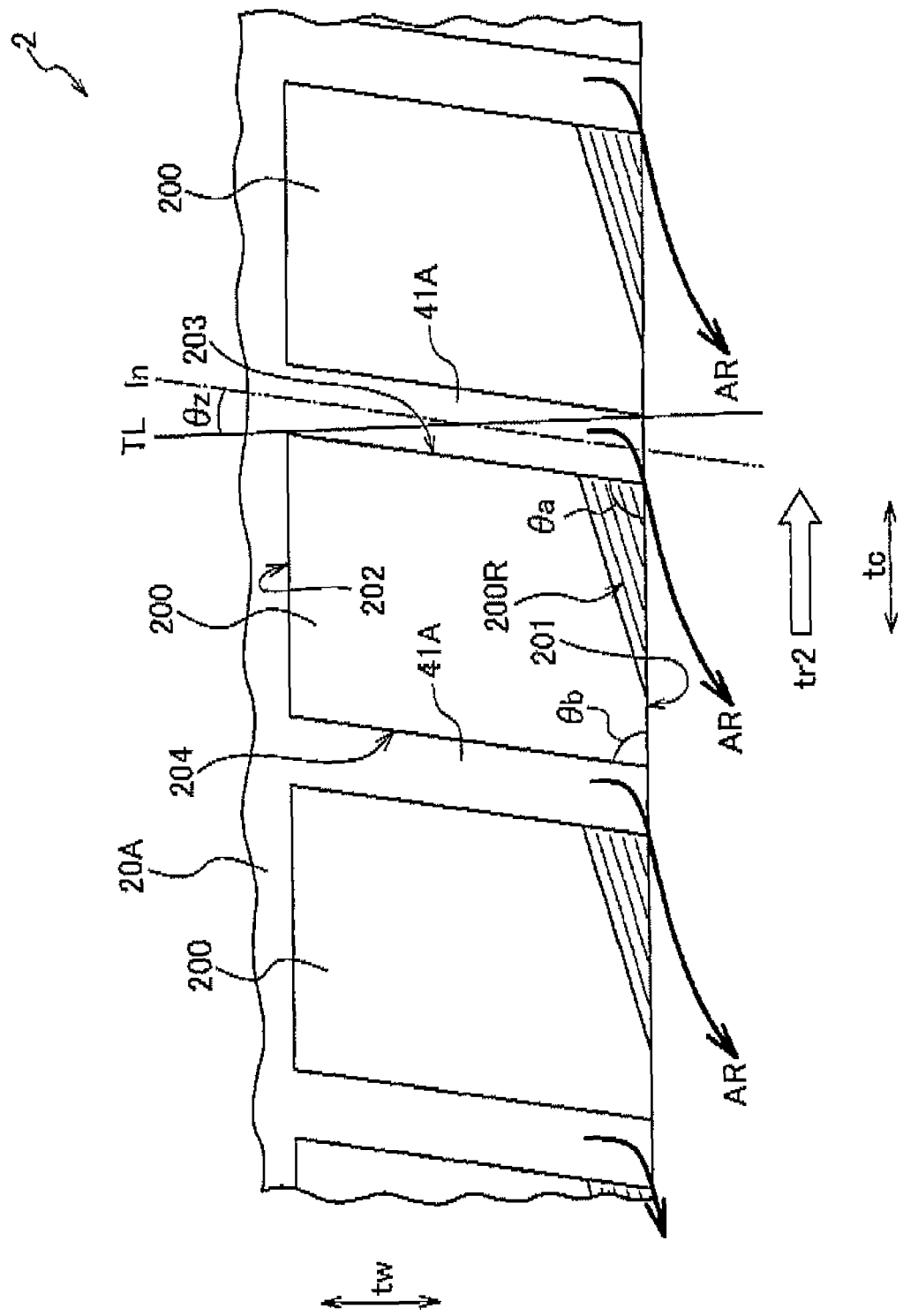
FIG. 8 is a plan view of the pneumatic tire shown as the modified example of the embodiment, which is viewed from the direction perpendicular to the tread portion.

FIGS. 7 and 8 are plan views of a pneumatic tire 2 shown as a modified example of the embodiment, which are viewed from a direction perpendicular to its tread portion. FIGS. 7 and 8 are schematic diagrams for explaining air flows AR that occur when the pneumatic tire 2 rotates in a rotational direction tr1. In the pneumatic tire 2 shown as Modified Example 1, lateral grooves 41A are inclined to tread width direction lines that are along the tread width direction tw. To be more precise, a center line ln of each lateral groove 41A along an extending direction of the lateral groove 41A formed in the circumferential land portion 30A is inclined by an angle θz to the corresponding tread width direction line TL along the tread width direction tw.

Each land-portion block 200 partitioned by the circumferential groove 20A and the lateral grooves 41A includes a ground-contact face 200S, a side face 201 on the buttress portion 14 side, a side face 202 located opposite from the side face 201, a lateral groove face 203 on one side in the tire circumferential direction tc of the land-portion block 200, a lateral groove face 204 on another side in the tire circumferential direction tc of the land-portion block 200, and a tapered face 200R which meet the ground-contact face 200S, the side face 201, and the lateral groove face 203.

When the inclined lateral groove 41A is formed as described above, an angle θa defined between the side face 201 that meets the tapered face 200R and the lateral groove face 203 that meets the tapered face 200R is preferably an obtuse angle. Specifically, when the inclined lateral groove 41A is formed, an angle θb defined between the side face 201 and the lateral groove face 204 becomes an acute angle. It is preferable that the tapered face 200R meet the side face 201 and the lateral groove face 203 which define the obtuse angle θa therebetween instead of meeting the side face 201 and the lateral groove face 204 which define the acute angle θb therebetween.

This is due to the following reason. Specifically, when the pneumatic tire 2 rotates in the rotational direction tr1 as shown in FIG. 7, an air flow (a relative wind) AR caused by the rotation collides with the lateral groove face 204 of the land-portion block 200 disposed downstream in the rotational direction tr1 and is taken into the corresponding lateral groove 41A. At this time, since the lateral groove 41A is inclined, the air flow AR is more likely to be taken into the lateral groove 41A. Thus, a heat transfer coefficient inside each lateral groove 41A is enhanced so that an effect to reduce a temperature of each land-portion block 200 can be enhanced.

Meanwhile, as shown in FIG. 8, when the pneumatic tire 2 rotates in the rotational direction tr2, an air flow (a relative wind) AR flowing along the side face 201 is created by the rotation of the pneumatic tire 2. For this reason, a discharge of the air from the corresponding lateral groove 41A to the outside in the tread width direction tw is promoted, so that a flow volume of the air flowing in the lateral groove 41A can be increased. Thus, the heat transfer coefficient inside each lateral groove 41A is enhanced so that the temperature of each land-portion block 200 can be reduced. Furthermore, it is possible to reduce the temperature of the tread portion 13.

Other Embodiments

Although the contents of the present invention have been described above with reference to a certain embodiment of the invention, the descriptions and drawings constituting part of this disclosure should not be construed as limiting the present invention. Various alternative embodiments and examples become obvious to those skilled in the art from this disclosure.

Figure 9:
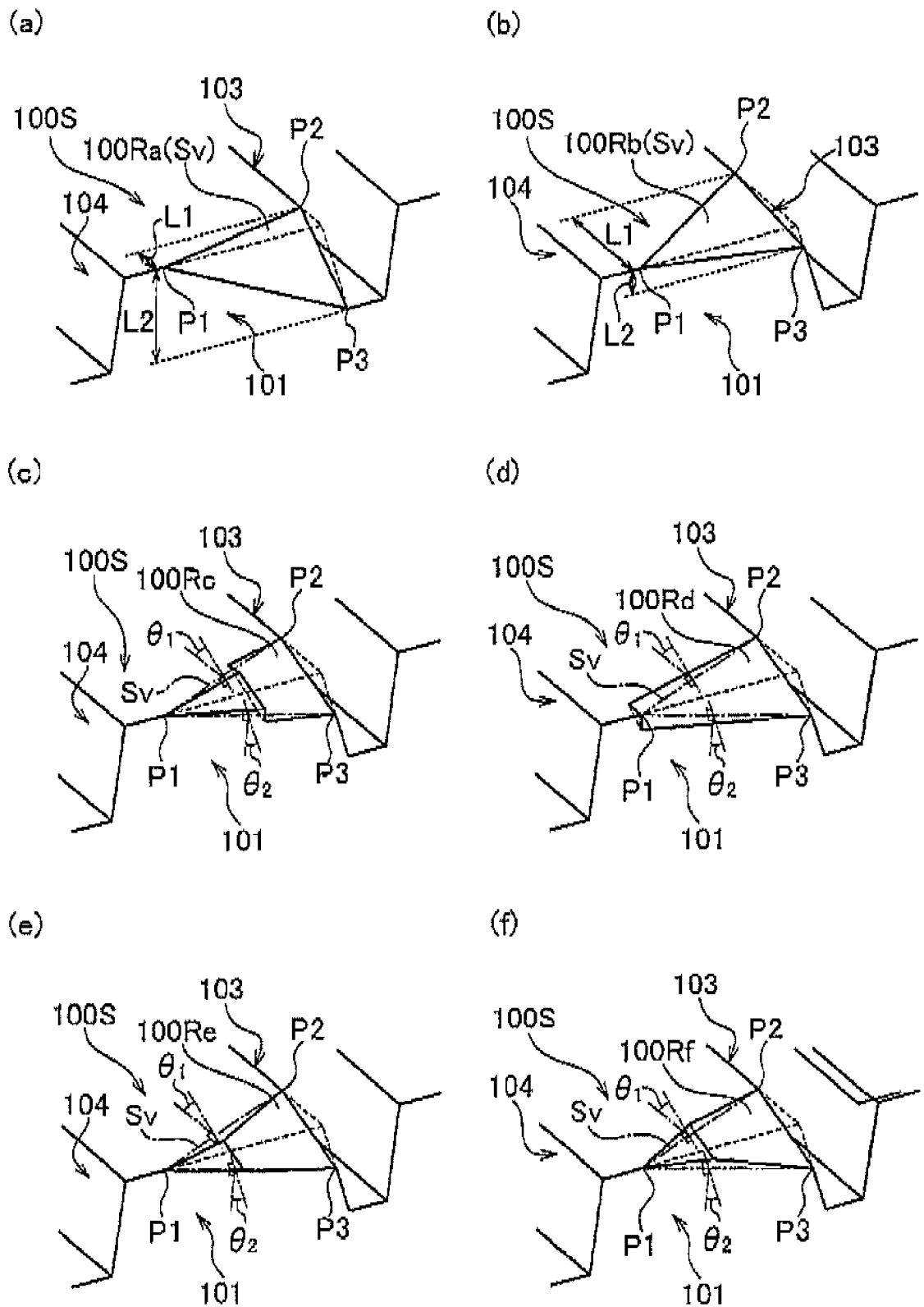
FIG. 9 provides enlarged perspective views which show land-portion blocks of pneumatic tires according to other embodiments of the present invention in an enlarged manner.
Figure 10:
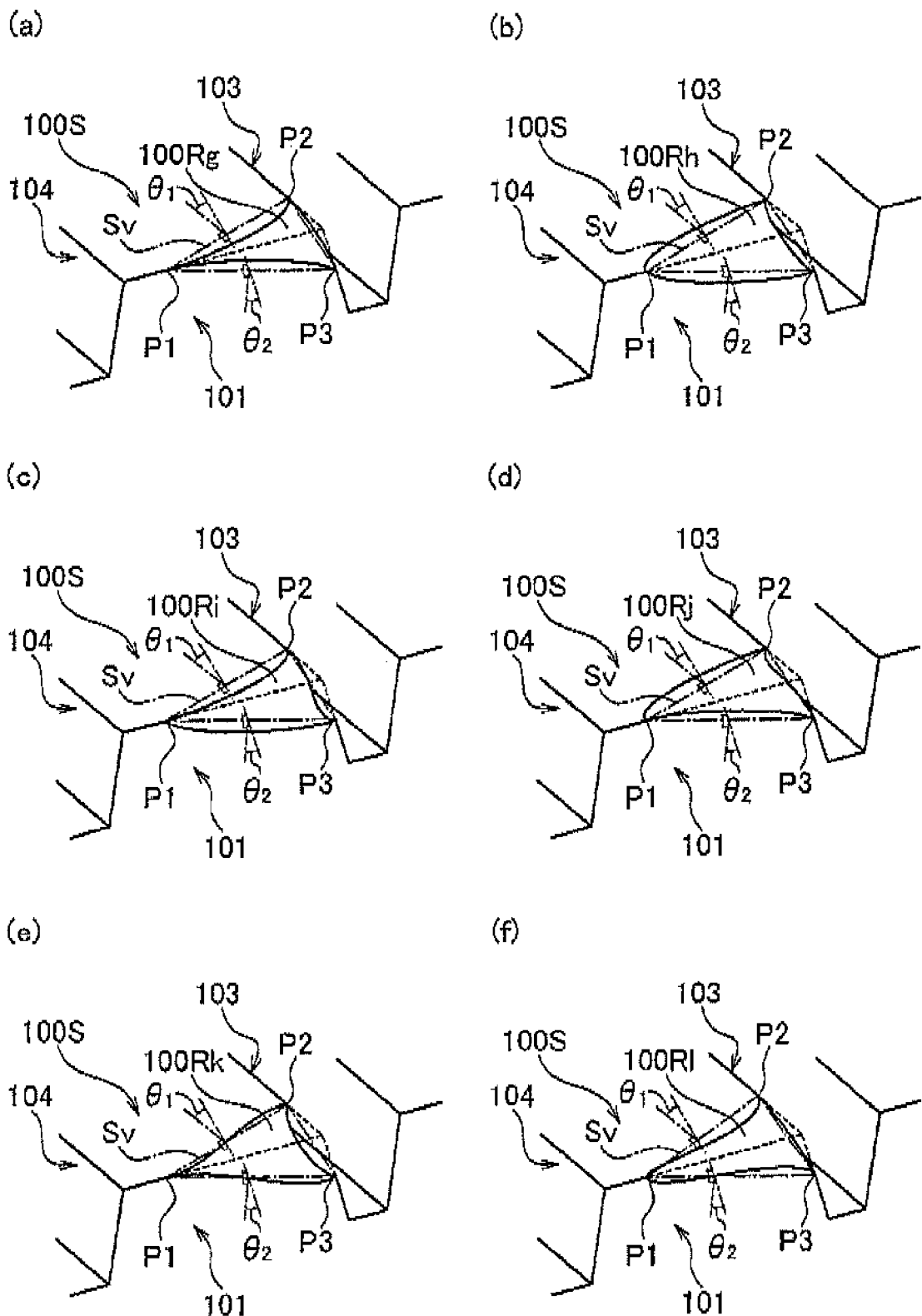
FIG. 10 provides enlarged perspective views which show land-portion blocks of pneumatic tires according to still other embodiments of the present invention in an enlarged manner.

FIGS. 9(a) to 9(f) are enlarged perspective views of land-portion blocks of pneumatic tires of other embodiments. As shown in FIG. 9(a), for example, in the land-portion block, a tapered face 100Ra (a plane Sv) may be formed in such a way that an interval L2 between a vertex P1 and a vertex P3 in the tire diametrical direction td is longer than an interval L1 between the vertex P1 and a vertex P2 in the tread width direction tw.

Meanwhile, as shown in FIG. 9(b), in the land-portion block, a tapered face 100Rb (a plane Sv) may be formed in such a way that an interval L2 between a vertex P1 and a vertex P3 in the tire diametrical direction td is shorter than an interval L1 between the vertex P1 and a vertex P2 in the tread width direction tw.

In the meantime, as shown in each of FIGS. 9(c) to 9(f), in the land-portion block, a tapered face 100R may be formed in a flexed manner. Further, the number of times of flexure in the tapered face 100R is not limited to one, but the tapered face 100R may be formed in such a way as to be flexed multiple times.

In each of tapered surfaces 100Rc to 100Rf shown in FIGS. 9(c) to 9(f) mentioned above, an angle θ1 defined between a plane Sv passing vertices P1 to P3 and a ground-contact face 100S is in the range of 0°<θ1<45°. Alternatively, an angle θ2 defined between the plane Sv and a side face 101 is in the range of 0°<θ2<45°.

Meanwhile, both of the tapered face 100R of the land-portion block 100 and the virtual plane Sv for defining the angles θ1 and θ2 are shown in each of FIGS. 9(c) to 9(f). Specifically, in each of FIGS. 9(a) and 9(b) mentioned above, the angle θ1 is defined on the basis of the tapered face 100R and the ground-contact face 100S, and the angle θ2 is defined on the basis of the tapered face 100R and the side face 101. On the other hand, in each of FIGS. 9(c) to 9(f), the angle θ1 is defined on the basis of the plane Sv and the ground-contact face 100S, and the angle θ2 is defined on the basis of the plane Sv and the side face 101.

That is, as in the cases of the land-portion blocks 100 shown in FIGS. 9(c) to 9(f) where tapered faces 100Rc to 100Rf do not coincide with the plane Sv passing the vertices P1 to P3, the angle θ1 is defined on the basis of the virtual plane Sv and the ground-contact face 100S, and the angle θ2 is defined on the basis of the virtual plane Sv and the side face 101.

Meanwhile, FIGS. 10(a) to 10(f) are enlarged perspective views of land-portion blocks in pneumatic tires of still other embodiments. As shown in FIGS. 10(a) to 10(f), in the land-portion blocks, tapered faces 100Rg to 100Rl may be formed into curved shapes. Specifically, in each of the land-portion blocks, the tapered face may be formed into a curved shape which is recessed to an inner side of (in the inside of) the block. Alternatively, the tapered face may be formed into a curved surface which projects to an outer side of (in the inside of) the block.

In each of the tapered surfaces 100Rg to 100Rl shown in FIGS. 10(a) to 10(f) mentioned above, an angle θ1 defined between a plane Sv passing vertices P1 to P3 and a ground-contact face 100S is in a range of 0°<θ1<45°. Alternatively, an angle θ2 defined between the plane Sv and a side face 101 is in a range of 0°<θ2<45°.

It is to be noted that each of FIGS. 10(a) to 10(f) shows the tapered face 100R of the land-portion block 100, and the virtual plane Sv for defining the angles θ1 and θ2, as in the cases of FIGS. 9(c) to 9(f) mentioned above.

While the pneumatic tires of the embodiments can achieve significant effects when adopted to so-called very large tires, they are also applicable to general-purpose tires. It is possible to enhance a heat transfer coefficient of such a pneumatic tire by providing a side face (a buttress portion) of a land portion, where the side face intersects with a width direction of a tread portion, with a tapered face in such a way as to be cut out from the side surface to the inner side of the land portion and to communicate with the corresponding lateral groove portion. Thus, a rise in temperature of a tread surface can be reduced in a situation such as traveling at a high speed or traveling on a bad road where the tread is prone to generate heat.

FIG. 1 has shown a typical example of a tread pattern of the pneumatic tire 1. However, the tread pattern is not limited only to the foregoing. For instance, the pneumatic tire 1 may be a tire including a rib land portion with no lateral grooves formed in the vicinity of its tire equator line.

The above-described embodiments explain that all the lateral groove portions (the lateral grooves 40 or the lateral grooves 41) are formed at the same angle to the tire circumferential direction. However, on the same pneumatic tire, the angles of the lateral groove portions to the tire circumferential direction do not always have to be the same angle. For example, the lateral grooves may be formed at different angles depending on those for the circumferential land portions 30A, 30B, and 30C. Furthermore, the lateral groove portions at different angles may be formed for the circumferential land portions 30A.

The above-described embodiments explain that the circumferential grooves 20A and 20B are formed in the tread portion. However, the circumferential grooves 20A and 20B do not always have to be formed. In other words, only the lateral groove portions (the lateral grooves 40 or the lateral grooves 41) may be formed in the tread portion.

In FIGS. 1 to 10, the above-described embodiments explain the examples in which the land-portion blocks located on one of outer sides in the tread width direction tw are provided with the tapered faces. Instead, the land-portion blocks located on both of the outer sides in the tread width direction tw may be provided with the tapered faces. Moreover, the multiple land-portion blocks may also be provided with the tapered faces in different shapes from one another.

Thus, it goes without saying that the present invention may include various embodiments and the like not described herein. Accordingly, the technical scope of the present invention should be determined only by the matters to define the invention in the scope of claims regarded as appropriate based on the above descriptions.

(Comparative Evaluation 1)

Next, a description will be given of a computational fluid dynamics analysis simulation conducted at the time of finding the critical values 0°<θ1<45° and 0°<θ2<45° in terms of the angle θ1 defined between the tapered face and the ground-contact face as well as the angle θ2 defined between the tapered face and a groove side face.

FIG. 11(a) shows an outline of the simulation. In a wide space where a uniform stream flows, a step is provided extending in a direction perpendicular to the stream and a slope portion is provided at a part of a corner of the step. A plane located in a negative direction on the y axis viewed from the center of the space is an inflow port of the wind and a plane located in a positive direction thereon is an outflow port of a wind. The uniform stream in the positive direction on the y axis exists in the space. A plane in a negative direction on the z axis is defined as a bottom face, and a boundary condition of a flow velocity of 0 is provided on a wall surface of the bottom face. The rest of the wall surfaces are virtual wall surfaces which do not actually exist, and are provided with so-called slip conditions in which flow velocity components other than that in the direction of the uniform stream (in the y axis direction) are set at 0. The step is formed in such a shape that its bottom surface declines in the negative direction on the z axis toward a downstream side of the uniform stream. By providing the corner portion of the step with the slope, the wind flowing along the bottom surface is drawn in the negative direction on the z axis by the slope. At this time, a change in average wind speed at a slope exit is investigated while changing an entrance angle α of the slope. Thus, a correlation between an ability of the slope to draw the wind and the entrance angle α of the slope was obtained. Since a focus was placed on the entrance angle α, a z-axis length of a cross section of the slope exit was set constant (a constant cross-sectional area) while the entrance angle was set variable, as shown in FIG. 11(b) (accordingly, a y-axis length of the slope portion becomes a dependent variable of the entrance angle.)

FIG. 11(c) shows results of the simulation. In FIG. 11(c), the horizontal axis indicates the slope entrance angle and the vertical axis indicates a ratio (%) of a volume of the wind passing through the slope exit relative to the flow velocity of the uniform stream. Calculations were carried out respectively by setting the flow velocity of the uniform stream at three different levels, namely, 8, 20, and 40 km/h. As seen in the graph, in any of the levels of the uniform stream, the volume of the wind taken in by the slope became almost equal to 0 at the entrance angle of 45°.

(Comparative Evaluation 2)

Next, a description will be given below of a comparative evaluation conducted by using pneumatic tires of a comparative example and an example in order to further clarify the effects of the present invention. It is to be noted, however, that the present invention is not limited to the following examples at all.

(1) Configurations of Pneumatic Tires

First of all, in the comparative evaluation, a pneumatic tire according to Conventional Example shown in FIG. 12(a) and a pneumatic tire according to Example 1 shown in FIG. 12(b) were prepared to begin with. Table 1 shows configurations of the pneumatic tires. Note that the pneumatic tires have the same configurations except for configurations of the tapered faces.

In addition, in this test, all the pneumatic tires had a tire size of 59/80R63. All the pneumatic tires were subjected to a temperature prediction simulation while setting an internal pressure at 600 kPa and applying a load of 101.6 tons.

A pneumatic tire in which the land-portion blocks were not provided with the tapered faces was used as the pneumatic tire of Conventional Example. A pneumatic tire in which the land-portion blocks were provided with the planar-shaped tapered faces was used as the pneumatic tire of Example 1. Here, it is to be noted that the tapered faces have the planar shape in the pneumatic tire of Example 1 and the tapered surfaces are the same as the plane Sv. Incidentally, details of the angle θ1 and the angle θ2 are as shown in Table 1.

(2) Evaluation Results

Next, results of the evaluation conducted by using the pneumatic tires will be described with reference to Table 1.

TABLE 1

|  | Conventional Example | Example 1 |
|---|---|---|
| Forming of Tapered Face | absent | present |
| Angle θ1 (°) between Plane Sv (Tapered Face) and Ground-contact face | — | 75° |
| Angle θ2 (°) between Plane Sv (Tapered Face) and Side Face | — | 20° |
| Temperature inside Tread (Average Value of Temperature in Upper Part of Outermost-Layer Belt | 100 | 98 |

In a heat radiation performance evaluation, a temperature prediction analysis was conducted for each of Conventional Example and Example by means of the simulation. An average value of a temperature in an upper part of the outermost-layer belt inside the tread was used as an evaluation index. In addition, a measurement value of the tire of Conventional Example was use as a reference (100), and an evaluation index representing a relative evaluation was calculated for the tire of Example 1.

In evaluation results in Table 1, a smaller evaluation index represents a better heat radiation performance. As seen in Table 1, the heat radiation performance of the tire of Example 1 was proved to be superior to that of the tire of Conventional Example. In other words, the pneumatic tire which satisfies that the angle θ1 defined between the plane Sv passing the vertices P1 to P3 of the tapered face and the ground-contact face 100S is in the range of 0°<θ1<45° or that the angle θ2 defined between the plane Sv and the side face 101 is in the range of 0°<θ2<45° was proved to be excellent in the radiation performance.

(Comparative Evaluation 3)

Figure 13:
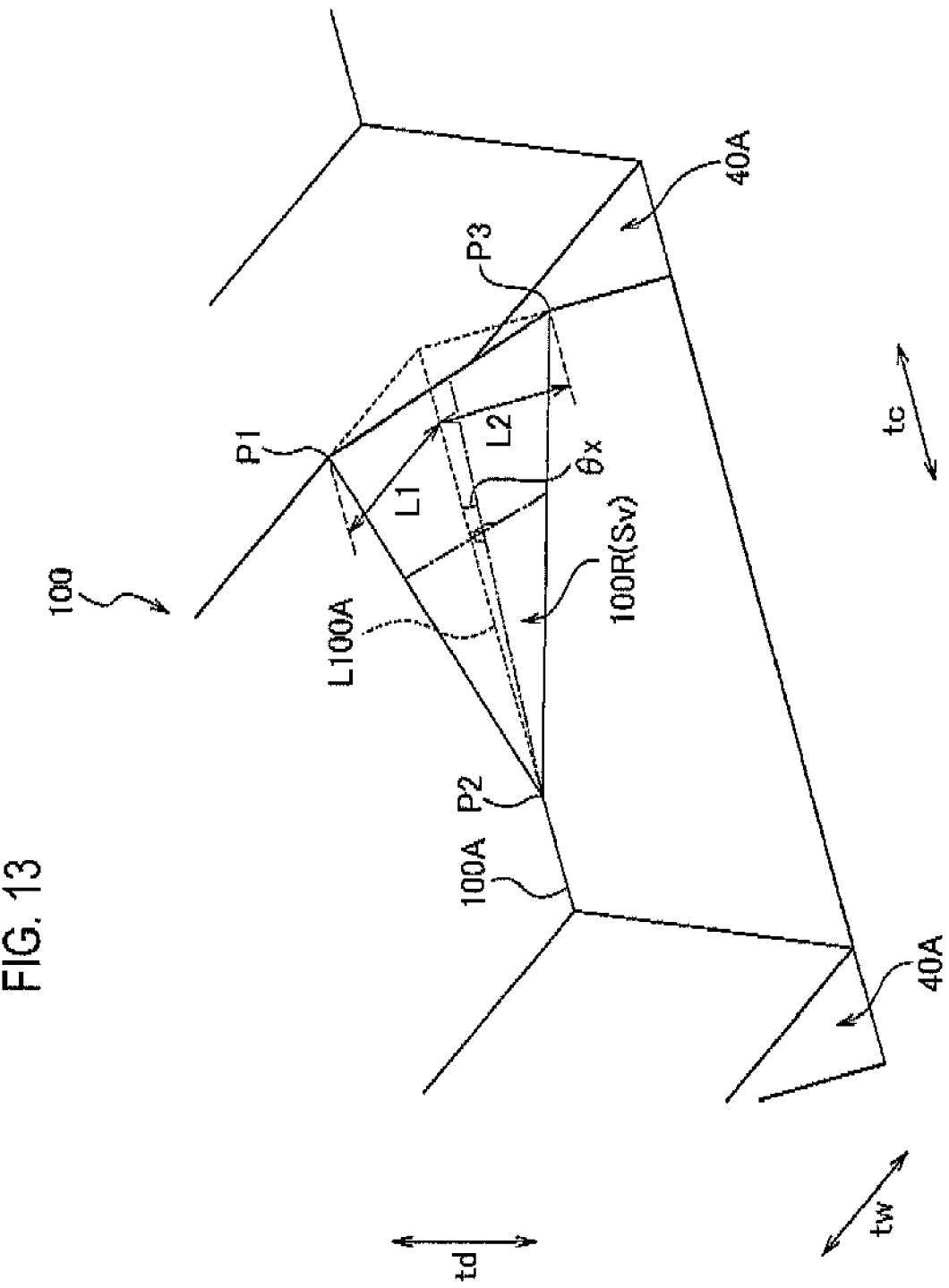
FIG. 13 is a perspective view showing an outline of a simulation model in Comparative Evaluation 3 of the present invention.

Next, a description will be given of a computational fluid dynamics analysis simulation conducted by using Examples 11 and 12 and Comparative Example. FIG. 13 is a perspective view showing an outline of a simulation model (a pneumatic tire) used in the simulation.

First, as shown in FIG. 13, along a corner portion 100A located outside in the tread width direction tw of the land-portion block 100, a phantom line L100A was defined in an extending direction of the corner portion 100A. Meanwhile, different inclination angles θx, each of which was defined between the phantom line L100A and the tapered face 100R, were set to Examples 11 and 12 and Comparative Example, respectively. To be more precise, the inclination angle θx in Example 11 was set at 20°, the inclination angle θx in Example 12 was set at 35°, and the inclination angle θx in Comparative Example was set at 55°.

Here, in each of Examples 11 and 12 and Comparative Example, the interval L1 and the interval L2 were set equal. To be more precise, the interval L1 and the interval L2 were set at 60 mm.

In addition, a mainstream flowing in the tire circumferential direction tc was provided to each of Examples 11 and 12 and Comparative Example described above. Then, a ratio of the speed of a wind in the lateral groove 40A (a lateral groove wind speed) to a wind speed of the mainstream (a mainstream wind speed) was calculated for each case. Here, the mainstream wind speed was set at 8 km/h (2.222 m/s). The lateral groove wind speed was calculated as an average value by dividing a total volume of wind flowing in the lateral groove 40A by the cross-sectional area of the lateral groove 40A.

Figure 14:
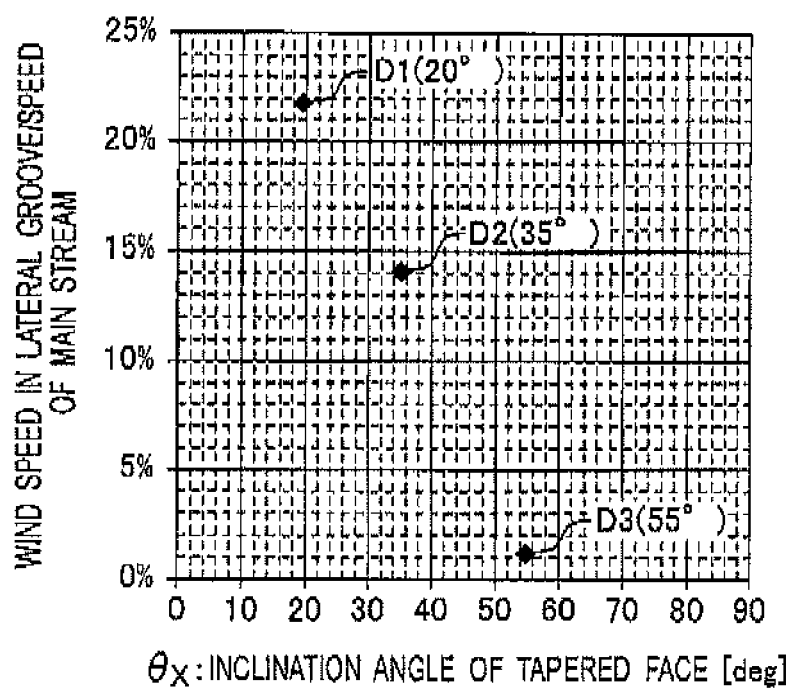
FIG. 14 is a graph showing simulation results in Comparative Evaluation 3 of the present invention.

Results are shown in FIG. 14. In FIG. 14, a result for Example 11 is indicated as data D1, a result for Example 12 is indicated as data D2, and a result for Comparative Example is indicated as data D3. In FIG. 14, a larger value of the ratio (%) of the wind speed indicated on the vertical axis represents a better cooling effect.

As shown in FIG. 14, Examples 11 and 12 had better cooling effects than Comparative Example. As a result, it was found that an excessive inclination angle θx led to a decline in the cooling effect. Meanwhile, Example 11 showed a tendency of a finer cooling effect than that of Example 12. As a result, it was found that the cooling effect was further enhanced by setting the inclination angle θx equal to or below 20°.

The entire contents of Japanese Patent Application No. 2011-255595 (filed on Nov. 22, 2011) are incorporated in this specification by reference.

INDUSTRIAL APPLICABILITY

As described above, the present invention can provide a tire which is capable of reliably enhancing a heat radiation performance without impairing rigidity and abrasion resistance of a tread portion, and the tire of the present invention is therefore useful.

The invention claimed is:

1. A tire comprising a tread portion to come into contact with a road surface, wherein
  a lateral groove portion extending in a direction intersecting with a tire circumferential direction, and a land portion partitioned by the lateral groove portion are formed in the tread portion, and
  the land portion includes:
    a ground-contact face to come into contact with the road surface;
    a side face formed on an outer side in a tread width direction of the land portion;
    a lateral groove face constituting a groove wall of the lateral groove portion formed on one end in the tire circumferential direction of the land portion; and
    a tapered face which meets the ground-contact face, the side face, and the lateral groove face in a corner portion formed by the ground-contact face, the side face, and the lateral groove face,
  wherein:
    the tapered face is formed such that an interval L2 between a vertex P1 at the lateral groove face and a vertex P3 at the side face in a tire diametrical direction is longer than an interval L1 between the vertex P1 and a vertex P2 at the ground-contact face in the tread width direction, and
    the tapered face is formed on an edge portion of a buttress portion side of the land portion, and
  wherein:
    the lateral groove portion is inclined to a tread width direction line along the tread width direction, and
    an angle defined between the side face which meets the tapered face and the lateral groove face which meets the tapered face is an obtuse angle.

2. The tire according to claim 1, comprising:
  a bead portion;
  a side wall portion continuous with the bead portion; and
  a buttress portion extending from a tread end portion located on an outer side in a width direction of the tread portion toward inside in a tire diametrical direction and being continuous with the side wall portion.

3. The tire according to claim 1, further comprising a circumferential groove portion extending in the tire circumferential direction, and
  the lateral groove portion communicates with the circumferential groove portion.

4. The tire according to claim 1, wherein
  when a plane is assumed which passes
    a vertex where the tapered face, the ground-contact face, and the side face meet,
    a vertex where the tapered face, the ground-contact face, and the lateral groove face meet, and
    a vertex where the tapered face, the side face, and the lateral groove face meet, the tire satisfies any one of conditions
    that an angle θ1 defined between the plane and the ground-contact face is in a range of 0°<θ1<45°, and
    that an angle θ2 defined between the plane and the side face is in a range of 0°<θ2<45°.

5. The tire according to claim 1, wherein the tapered face has a planar shape.

* * * * *